(12) United States Patent
Miller et al.

(10) Patent No.: US 6,442,484 B1
(45) Date of Patent: Aug. 27, 2002

(54) METHOD AND APPARATUS FOR PRE-CRASH THREAT ASSESSMENT USING SPHEROIDAL PARTITIONING

(75) Inventors: Ronald Hugh Miller, Saline; Irving Toivo Salmeen, Ann Arbor; Anya Lynn Tascillo, Belleville, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,593

(22) Filed: Jan. 23, 2002

(51) Int. Cl.[7] ................................................. G05D 1/02
(52) U.S. Cl. ....................... 701/301; 701/200; 340/990; 340/995
(58) Field of Search ................................. 701/301, 200, 701/208; 340/990, 995; 180/167

(56) References Cited

U.S. PATENT DOCUMENTS 4,979,113 A * 12/1990 Roberts et al. ................ 701/24
4,986,384 A * 1/1991 Okamoto et al. ........... 180/167

* cited by examiner

Primary Examiner—William A. Cuchlinski, Jr.
Assistant Examiner—Marthe Y. Marc-Coleman
(74) Attorney, Agent, or Firm—Frank A. MacKenzie

(57) ABSTRACT

A method for operating a pre-crash sensing system for a vehicle having an object detecting system and an associated data storage. The method includes partitioning the vehicle operating environment into a plurality of zones wherein each zone represents a different area surrounding the vehicle. In response to detecting an object within any one of the zones, the method activates the zone, and modifies an state of the object detection system and the contents of,the data storage as a function. the active zone. In one embodiment, three zones are disclosed wherein each zone represents a spheroidal area surrounding the vehicle. When the furthest zone is active, all data within the data storage is given approximately equal processing priority. When the middle zone is active, the content of the data storage is modified to prioritize data regarding the detected object for processing. Finally, when the nearest zone is active, the content of the data storage is further modified to provide highest priority to data regarding the detected object.

20 Claims, 5 Drawing Sheets

METHOD AND APPARATUS FOR PRE-CRASH THREAT ASSESSMENT USING SPHEROIDAL PARTITIONING

BACKGROUND OF INVENTION

The present invention relates to pre-crash sensing systems for automotive vehicles, and more particularly, to pre-crash sensing systems having spheroidal partitioning for real-time safety threat assessment.

Auto manufacturers are investigating radar, lidar, and vision-based pre-crash sensing systems to improve occupant safety. Current vehicles typically employ accelerometers that measure forces acting on the vehicle body. In response to accelerometers, airbags or other safety devices are employed. Also, Global Position Systems (GPS) are used in vehicles as part of navigation systems.

In certain crash situations, it would be desirable to provide information to the vehicle operator before forces actually act upon the vehicle. As mentioned above, known systems employ combinations of radar, lidar and vision systems to detect the presence of an object in front of the vehicle a predetermined time before an actual crash occurs. Such systems have expense constraints and can be prone to false positives.

Other systems broadcast their positions to other vehicles where the positions are displayed to the vehicle operator. The drawback to this type of system is that the driver is merely warned of the presence of a nearby vehicle without more. In a crowded traffic situation, it may be difficult for a vehicle operator to react to a crowded display.

Information processing and bandwidth for communications can also limit safety applications. As more sensing devices are implemented, the signals generated must be processed, actions determined, and control signals communicated to safety modules having their own reaction latency. For example, airbag deployment, seatbelt pretensioning, nose dipping and braking have latencies of approximately 100 ms, 180 ms, 300 ms and 400 ms, respectively. Having an intelligent methodology which can learn and make efficient use of processing cycles, available data and communication bandwidth is desirable for a robust in-vehicle threat assessment.

It would be desirable to provide a system that takes into consideration the position of other vehicles and provides adequate warning to the vehicle operator and, should the situation warrant, provides crash mitigation.

SUMMARY OF INVENTION

The present invention provides an improved pre-crash sensing-system using spheroidal partitioning of the vehicle environment to warn the vehicle operator and respond to detected objects.

In one aspect of the invention, a method for operating a pre-crash sensing system for a vehicle having an object detecting system and an associated data storage is provided. The method includes partitioning the vehicle-operating environment into a plurality of zones wherein each zone represents a different area surrounding the vehicle. In response to detecting an object within any one of the zones, the method activates the zone, and modifies an operating state of the object detection system and the contents of the data storage as a function the active zone. In one embodiment, three zones are disclosed wherein each zone represents a spheroidal area the vehicle. When the furthest zone is active, all data within the data storage is given approximately equal processing priority. When the middle zone is active, the content of the data storage is modified to prioritize data regarding the detected object for processing. Finally, when the nearest zone is active, the content of the data storage is further modified to provide highest priority to data regarding the detected object.

One advantage of the invention is that the spheroidal portioning of the vehicle environment allows for prioritizing data processing and communication. This reduces the amount of unnecessary information exchanged and therefore communication is expedited allowing more time for the vehicle operator or countermeasure device to react to a detected object.

Other aspects and features of the present invention will become apparent when viewed in light of the detailed description of the preferred embodiment when taken in conjunction with the attached drawings and appended claims.

BRIEF DESCRIPTION OF DRAWINGS

For a more complete understanding of this invention, reference should now be made to the embodiments illustrated in greater detail in the accompanying drawings and described below by way of examples of the invention.

DETAILED DESCRIPTION

Figure 1:
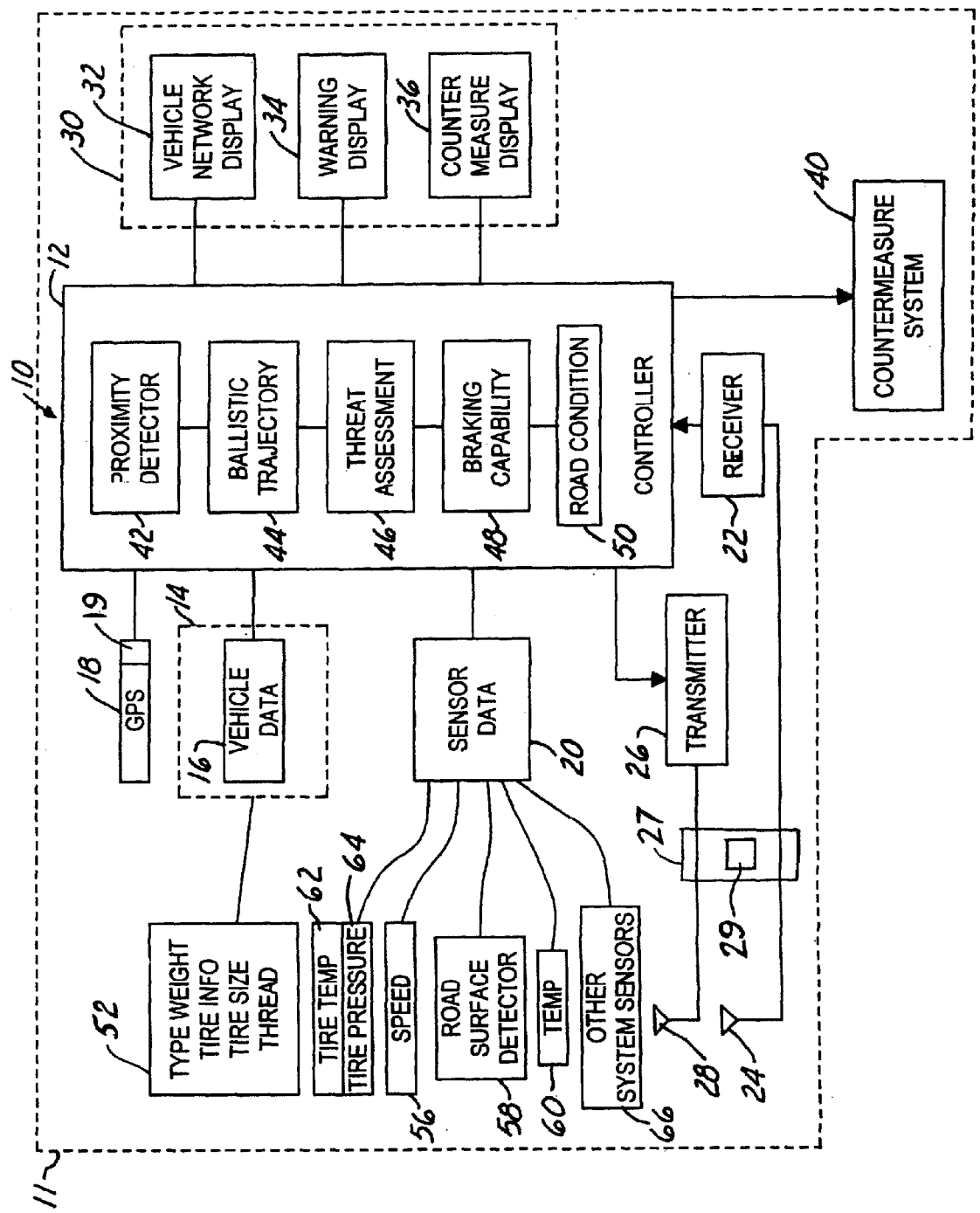
FIG. 1 is a block diagrammatic view of a pre-crash sensing system according to one embodiment of the present invention.

In the following figures, the same reference numerals will be used to identify the same components in the various views.

Referring now to FIG. 1, a pre-crash sensing system 10 for an automotive vehicle 11 has a controller 12. Controller 12 is preferably a microprocessor-based controller that is coupled to a memory 14. Controller 12 has a corresponding CPU that is programmed to perform various tasks, as well as inputs/outputs and a communications bus. Memory 14 is illustrated as a separate component from that of controller 12. However, those skilled in the art will recognize that memory may be incorporated into controller 12.

Memory 14 may comprise various types of memory including read only memory, random access memory, electrically erasable programmable read only memory, and keep alive memory. Memory 14 is used to store various thresholds and parameters including vehicle data 16 as illustrated.

Controller 12 is coupled to a global positioning system (GPS) 18 that receives position data triangulated from satellites as is known to those skilled in the art.

Controller 12 is coupled to a sensor data block 20 that represents various sensors located throughout the vehicle. The various sensors will be further described below.

Controller 12 may also be coupled to a receiver 22 coupled to a receiving antenna 24 and a transmitter 26 coupled to a transmitting antenna 28. Transmitter 26 and receiver 22 may be part of a transponder 27. Transponder 27 can be located at the front of the vehicle 11. Preferably, vehicle has a transponder located on each of the four sides of the vehicle. That is, a rear transponder is located at the rear of the vehicle, a transponder is located on the left side of the vehicle and, a transponder is located on the right side of the vehicle. A radar sensor 29 is located within each transponder. When a radar signal having a certain amplitude is detected, transmitter 26 generates a response that includes its location relative to the vehicle. Other data such as sensor data, position data, and other data may also be communicated. An example of a radar signal is a cruise control signal from an active cruise control system.

Controller 12 is also coupled to a display 30 that may include various types of displays including a vehicle network display, a warning display 34, and a counter-measure display 36. An example of a network display will be described in further detail below. As should be noted, display 30 may be a single display with different display features or may be individual displays that may include audible warnings as well.

Controller 12 has various functional blocks illustrated within CPU 13. Although these functional blocks may be represented in software, they may also be implemented in hardware. As will be further described below, controller 12 has a proximity detector 42 that is used to determine the proximity of the various vehicles around automotive vehicle 11. A vehicle trajectory block 44 is used to determine the trajectory of the vehicle and surrounding vehicles. Based upon the vehicle trajectory block 44, a threat assessment is made in functional block 46. Of course, threat assessment 46 takes into consideration various vehicle data 16 and sensor data from sensor block 20. Threat assessment 46 may be made based upon the braking capability of the present vehicle and surrounding vehicles in block 48 and also road conditions of the present vehicle and surrounding vehicles in block 50. As will be further described below, the road conditions of block 50 may be used to determine the braking capability in block 48.

In block 16, various vehicle data are stored within the memory. Vehicle data represents data that does not change rapidly during operation and thus can be fixed into memory. Various information may change only infrequently and thus may also be fixed into memory 14. Vehicle data includes but is not limited to the vehicle type, which may be determined from the vehicle identification number, the weight of the vehicle and various types of tire information. Tire information may include the tire and type of tread. Such data may be loaded initially during vehicle build and may then manually be updated by a service technician should information such as the tire information change.

Global positioning system (GPS) 18 generates a position signal for the vehicle 11. Global positioning system 18 updates its position at a predetermined interval. Typical interval update periods may, for example, be one second. Although this interval may seem long compared to a crash event, the vehicle position may be determined based upon the last update from the GPS and velocity and acceleration information within the vehicle.

Global positioning system 18 has a clock that is common to all GPS. Clock 19 provides a timing signal. Each of the GPS for different vehicles uses the same clock and timing signal. As will be described below, the common clock for timing signal is used to synchronize the communication between the various vehicles of the system.

Sensor data 20 may be coupled to various sensors used in various systems within vehicle 11. Sensor data 20 may include a speed sensor 56 that determines the speed of the vehicle. Speed sensor may for example be a speed sensor used in an anti-lock brake system. Such sensors are typically comprised of a toothed wheel from which the speed of each wheel can be determined. The speed of each wheel is then averaged to determine the vehicle speed. Of course, those skilled in the art will recognize that the vehicle acceleration can be determined directly from the change in speed of the vehicle. A road surface detector 58 may also be used as part of sensor data 20. Road surface detector 58 may be a millimeter radar that is used to measure the road condition. Road surface detector 58 may also be a detector that uses information from an anti-lock brake system or control system. For example, slight accelerations of the wheel due to slippage may be used to determine the road condition. For example, road conditions such as black ice, snow, slippery or wet surfaces may be determined. By averaging microaccelerations of each tire combined with information such as exterior temperature through temperature sensor 60, slippage can be determined and therefore the road conditions may be inferred therefrom. Such information may be displayed to the driver of the vehicle. The surface conditions may also be transmitted to other vehicles.

Vehicle data 16 has a block 52 coupled thereto representing the information stored therein. Examples of vehicle data include the type, weight, tire information, tire size and tread. Of course, other information may be stored therein.

Sensor data 20 may also include a tire temperature sensor 62 and a tire pressure sensor 64. The road condition and the braking capability of the vehicle may be determined therefrom.

Other system sensors 66 may generate sensor data 20 including steering wheel angle sensor, lateral acceleration sensor, longitudinal acceleration sensor, gyroscopic sensors and other types of sensors.

Figure 2:
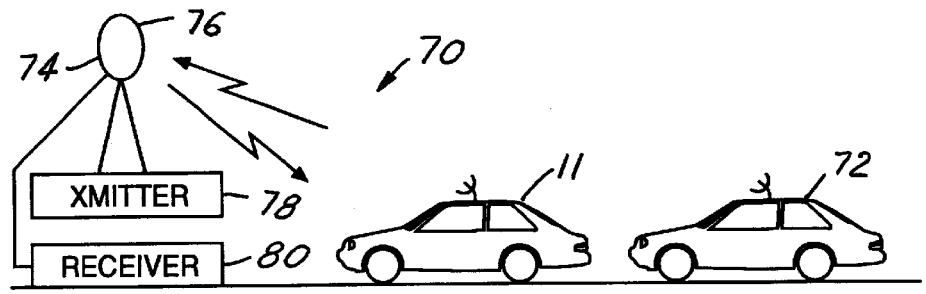
FIG. 2 is a block diagrammatic view of one embodiment of the invention illustrating a vehicle network established by two pre-crash sensing systems.

Referring now to FIG. 2, vehicle 11 may be part of a network 70 in conjunction with a second vehicle or various numbers of vehicles represented by reference numeral 72. Vehicle 72 preferably is configured in a similar manner to that of vehicle 11 shown in FIG. 1. Vehicle 72 may communicate directly with vehicle 11 through transmitter 26 and receiver 22 to form a wireless local area network. The network 70 may also include a repeater 74 through which vehicle 11 and vehicle 72 may communicate. Repeater 74 has an antenna 76 coupled to a transmitter 78 and a receiver 80. Various information can be communicated through network 70. For example, vehicle data, position data, and sensor data may all be transmitted to other vehicles throughout network 70.

Figure 3:
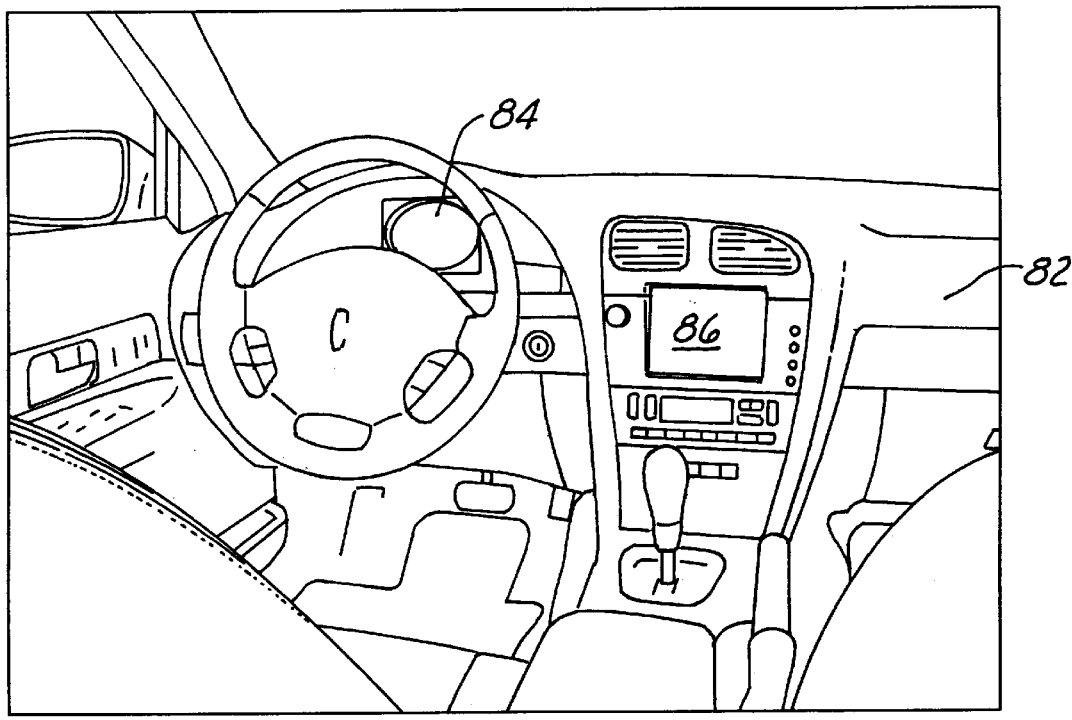
FIG. 3 is a perspective view of an automotive vehicle instrument panel display for use with the present invention.

Referring now to FIG. 3, an instrument panel 82 is illustrated having a first display 84 and a second display 86. Either displays 84, 86 may be used generate various information related to the pre-crash sensing system.

Figure 4:
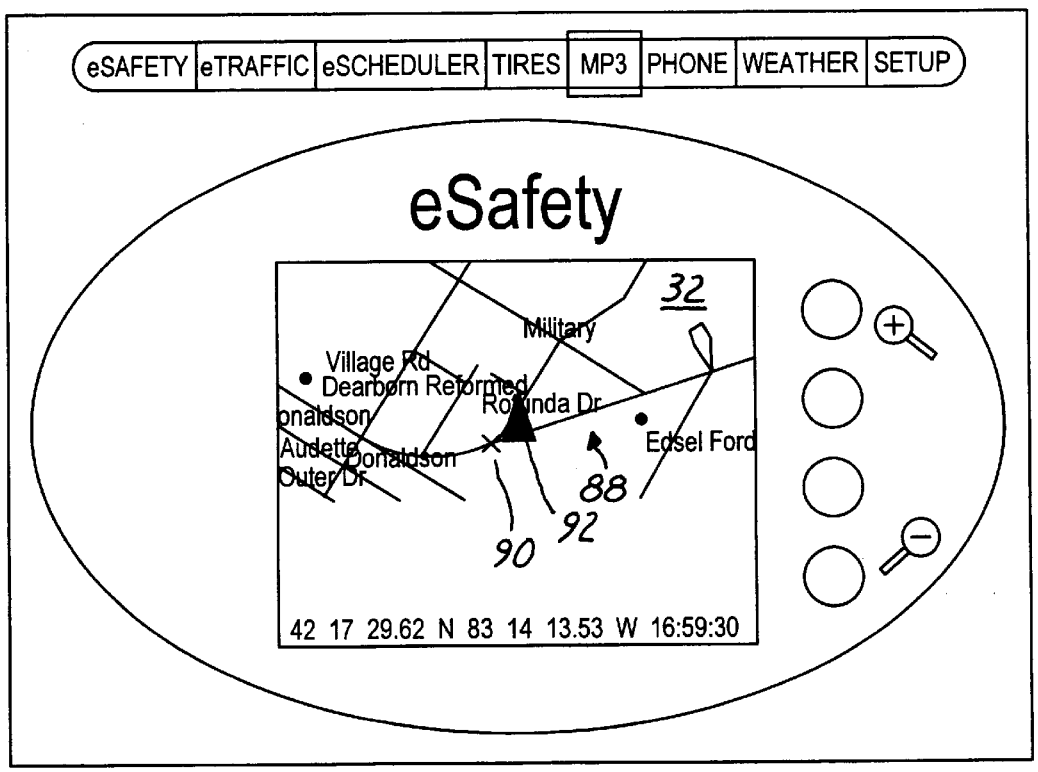
FIG. 4 is a front view of a vehicle network display according to an embodiment the present invention.

Referring now to FIG. 4, display 84 is illustrated in further detail. Display 84 can be configured to correspond to the vehicle network display warning display and countermeasure display mentioned above. The vehicle network display 32 may include a map 88, a first vehicle indicator 90, and a second vehicle indicator 92. First vehicle indicator corresponds to the driven vehicle having the present pre-crash sensing system, while vehicle indicator 92 corresponds to an approaching vehicle. Vehicle network display 32 may be displayed when a vehicle is near but beyond a certain distance or threat level. The vehicles on the display may be those within the field of view or those broadcasting signals as will be described below.

Warning indicators and distance indicators can also be displayed to provide the vehicle operator with an indication of the distance from a detected vehicle or object. The display may indicate a warning when the vehicle is within a predetermined distance or when an urgent threat level exists.

Display 84 can also be configured to a counter-measure display to indicate to the vehicle operator that a countermeasure is being activated because the threat level is high or the distance from the vehicle is within a predetermined distance less than the distances needed for activation of the vehicle network display or warning display.

Display 84 is a screen-based display such as an LCD, LED, or CRT display, or may be implanted as a heads-up display (HUD) overlaying the forward vision of the vehicle operator to through the windshield. Other known display mechanisms as also contemplated by the present invention.

Figure 5:
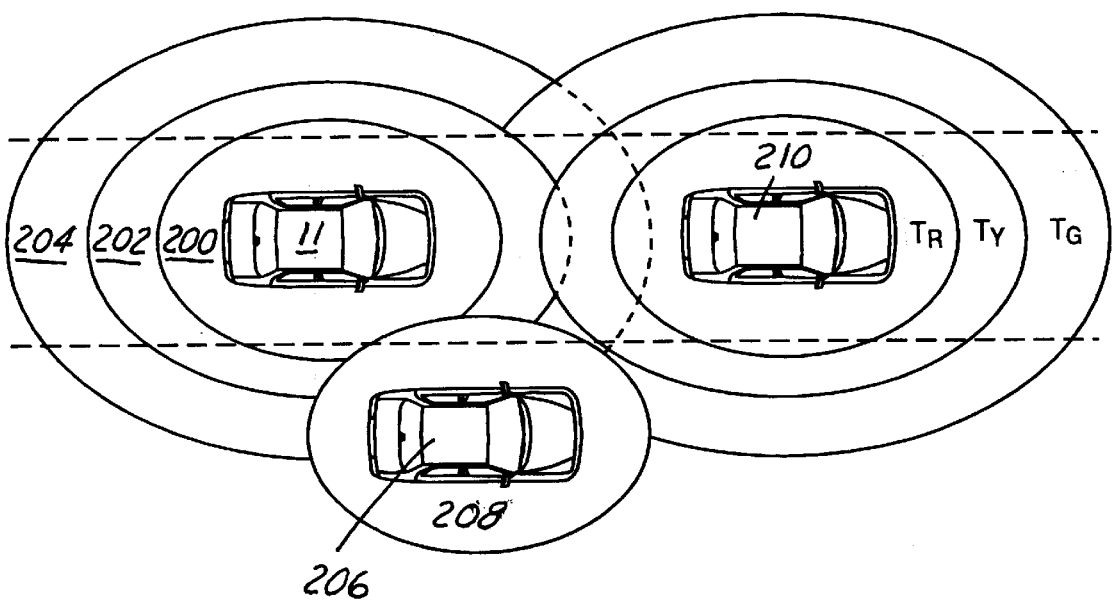
FIG. 5 is a schematic diagram of a spheroidal partition of a vehicle environment according to an embodiment of the present invention.

Referring now to FIG. 5 there is shown a schematic diagram of a spheroidal partition of a vehicle environment according to an embodiment of the present invention. Display 84 or display 86 can be configured to depict a "birds-eye" field of view or overhead field of view for vehicle 11 to communicate information regarding a surrounding environment to the vehicle operator. The environment surrounding the vehicle 11 is divided into three threat assessment zones identified as red zone 200 ($T_R$), yellow zone 202 ($T_Y$), and green zone 204 ($T_G$). Each of the zones 200, 202, and 204 are concentric with the vehicle 11. Similar concentric zones exist for vehicles similarly equipped with a pre-crash threat assessment system. Preferably, the zones are spheroidal and three-dimensional to help determine whether vehicles which appear to be on the same plane are about to collide, such as at an intersection; or whether the vehicles are traveling in different planes, such as when one of the vehicles is on an overpass and does not pose a collision threat with any otherwise adjacent vehicle. The three dimensional information is obtained from the GPS sensing system.

Each of the green, yellow, and red zones describes the temporal relationships surrounding the vehicle 11 and is based on multi-varied information such as vehicle speed, headway distance between other vehicles, geographic information, and driver characteristics, for example.

The green zone 204 represents a low risk zone with long temporal scales. For example, the green zone may represent the region between approximately 30 m and 50 m from the vehicle of interest. In this region, adjacent vehicles are interacting weakly by way of a virtual floating network (FIG. 2) through transponders located on the vehicles. In the green zone 204, information is shared between nearby vehicles enabling traffic monitoring and rerouting, for example, as is necessary or desirable. The green zone 204 is considered a very low threat zone.

The yellow zone 202 represents a moderate risk with temporal scales on the order of approximately one to five seconds. The yellow zone may represent, for example, a region between 10 m and 30 m from the vehicle 11. The threat assessment data is fundamentally different in this region as compared to the green zone 204. Thus, the update and/or refresh rates for the sensors communicating threat assessment data as well as the communication of the respective data occur on faster time scales than in the green zone. For adjacent vehicles, a time-to-collision value between vehicles in close proximity acts as a time boundary within which threat assessments and, if necessary, countermeasure deployment must occur. Accordingly, data communicated on the vehicle network is prioritized such that the most important data is processed first whereas other types of data are given less priority such as navigational data, entertainment data, or other types of convenience items.

Inside the red zone 200, the network is focused only on communication between vehicles in very local proximity representing an impending threat. Thus, there occurs a further data priority as compared to the yellow zone 202. Red zone may represent, for example, the region within 10 m surrounding the vehicle 11. Threat assessment data is filtered and processed based upon identification of the threatening vehicle. If the potentially threatening vehicle 206 is communicating wirelessly with the vehicle 11, the resulting data is processed at the fastest rate and given highest priority. If, however, adjacent vehicle 206 is not wirelessly equipped to communicate with vehicle 11, the sensor or sensor group of vehicle 11 which can uniquely identify vehicle 206 is used and given priority. The type and location data of vehicle 206 is given highest priority in the threat assessment controller of vehicle 11 and monitored continually until an event changes the priority selection for the detected vehicle 206.

The spheroidal partitioning of the vehicle environment for vehicle 11 may be configured such that actions may be taken as corresponding zones of an adjacent vehicle interfere with or are detected within the green, yellow, and red zones 204, 202, 200 of vehicle 11. Thus, when the red zone 208 of vehicle 206 impinges upon the red zone 200 of vehicle 11, actions may be taken. Alternatively, vehicle 206 could be considered to be only within the yellow zone 202 of vehicle 11. Likewise, forward vehicle 210 could be considered to be in the yellow zone 202 of vehicle 11, or entirely outside the green zone 204 of vehicle 11 depending upon the configuration of the areas represented by the respective zones.

In summary, the green zone is characterized by a virtual floating network between all adjacent vehicles and represents a relatively low risk of impact with a detected object due to the long temporal scales involved such as greater than 5 seconds. To the extent that any modification is desired of the vehicle trajectory, it can be accomplished by braking or rerouting suggestions as the vehicles are only weakly interacting with each other. The yellow zone represents a more moderate impact risk wherein reactions are occurring on a scale of between approximately 1 second and 5 seconds. In the yellow zone, the virtual floating network is more properly characterized as a peer-to-peer network between the vehicle 11 and the detected vehicle or object of interest within the yellow zone. In such cases, the vehicle 11 can be said to be moderately interacting with the detected vehicle or object. In order to avoid impending collision, hard maneuvering, for example, may be required. In the red zone, the threat assessment is characterized as high risk due to the short time to impact of approximately less than 1second. In such cases, smart transponders on the vehicle 11 are given highest priority for continuous threat assessment and mitigation in the form of, for example, active countermeasures. In such cases, the vehicle 11 can be said to be strongly interactive with a detected object or vehicle.

Figure 6:
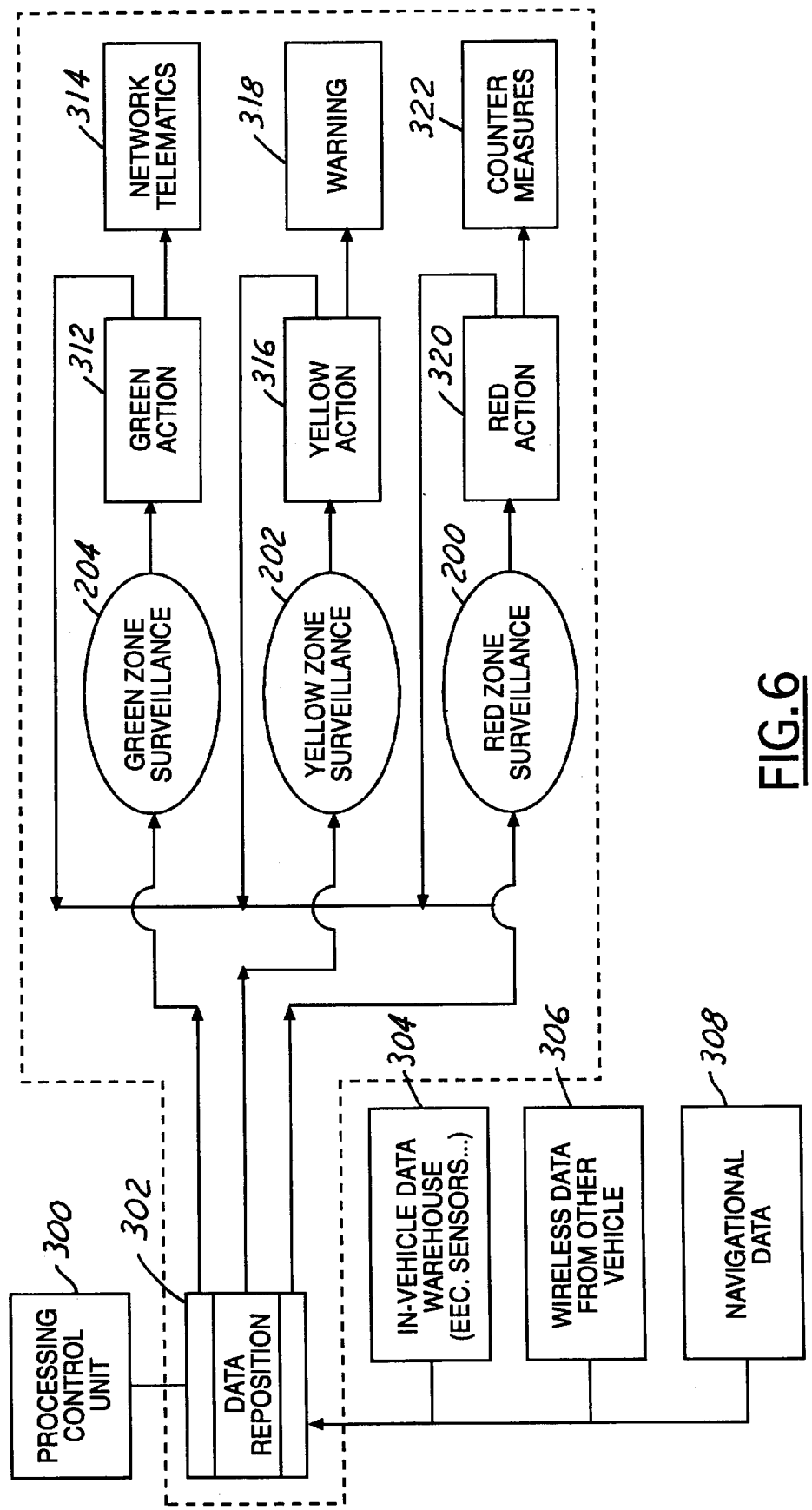
FIG. 6 is a block diagram of a spheroidal threat assessment system according to the present invention.

Referring now to FIG. 6 there is shown a block diagram of a spheroidal threat assessment system according to an embodiment of the present invention. The control scheme is governed by the processing control unit (PCU) 300 such as the controller 12 of FIG. 1. The PCU is in operative communication with a data repository 302, the content of which is a function of the surveillance zone (green, yellow or red) active at a given moment in time. The data repository 302 thus can contain information from the in-vehicle data warehouse 304, wireless data from other vehicles 306 as well as navigational data 308 from the GPS or wireless network. The in-vehicle data warehouse 304 contains the vehicle data 16 and sensor data 20 (FIG. 1). The wireless data from other vehicles 306 potentially represents the most critical data source for impact assessment and mitigation since it is enabled by vehicle-to-vehicle communication. Transponder information from transponder 27 can be used to further enhance the information warehouse 304. By aggregating the information and comparing differences between in-vehicle data and shared data, the PCU 300 can determine uniquely the surrounding vehicles, sensing technologies, location, and threat potential of detected objects.

Depending upon whether the red zone 200, yellow zone 202, or green zone 204 is active, different actions are taken as mentioned above. Thus, the green actions 312 include continued information sharing through network telematics 314 to allow for traffic monitoring and rerouting, for example. Yellow actions 316 include prioritizing data within the data repository 302 based upon the time-to-collision of the detected object or vehicle. Data prioritization may include increasing the update and/or refresh rates for the sensors as well as the speed at which communicated data occurs. Data prioritization may also include processing more important data first and moving other data to background processing such as navigational data or entertainment related data. A peer-to-peer network may also be established between the vehicle and the detected vehicle such that mitigating action may be taken in either the driven vehicle or the detected vehicle or both. A yellow action 316 may also result in a warning 318 being displayed within the vehicle.

Red actions 320 include further prioritization of the data repository 302 to filter and process specific data based upon the identification of the detected object or vehicle. Thus, vehicle trajectory data and type and location data is given the highest priority within the PCU 300 and the sensor or sensor set uniquely associated with providing such information is given the highest priority as well. If an impact with a detected object or vehicle is eminent, red actions 320 may include active or passive countermeasures 322.

The green and yellow actions 312, 316 may also transition to a higher priority (red zone surveillance) based upon actions of the vehicle operator in addition to events on the road or with respect to detected objects. For example, referring again to FIG. 5, vehicle 206 in the process of merging into the lane of vehicle 11 would interact strongly with vehicle 11 and depending upon the trajectory of vehicle 206 and rate of change of trajectory, a green zone interaction may change to a yellow zone or a green zone interaction may change directly to a red zone. Similarly, if vehicle 210 was in the green zone of surveillance and the operator of vehicle 11 was, for example, to start talking on the telephone, the green zone surveillance may change to a yellow zone due to the diversion of the driver's attention from the road. In this way, a heightened sense of awareness between vehicle 210 and vehicle 11 can augment the vehicle operator's ability to focus at the task of driving the vehicle 11.

Figure 7:
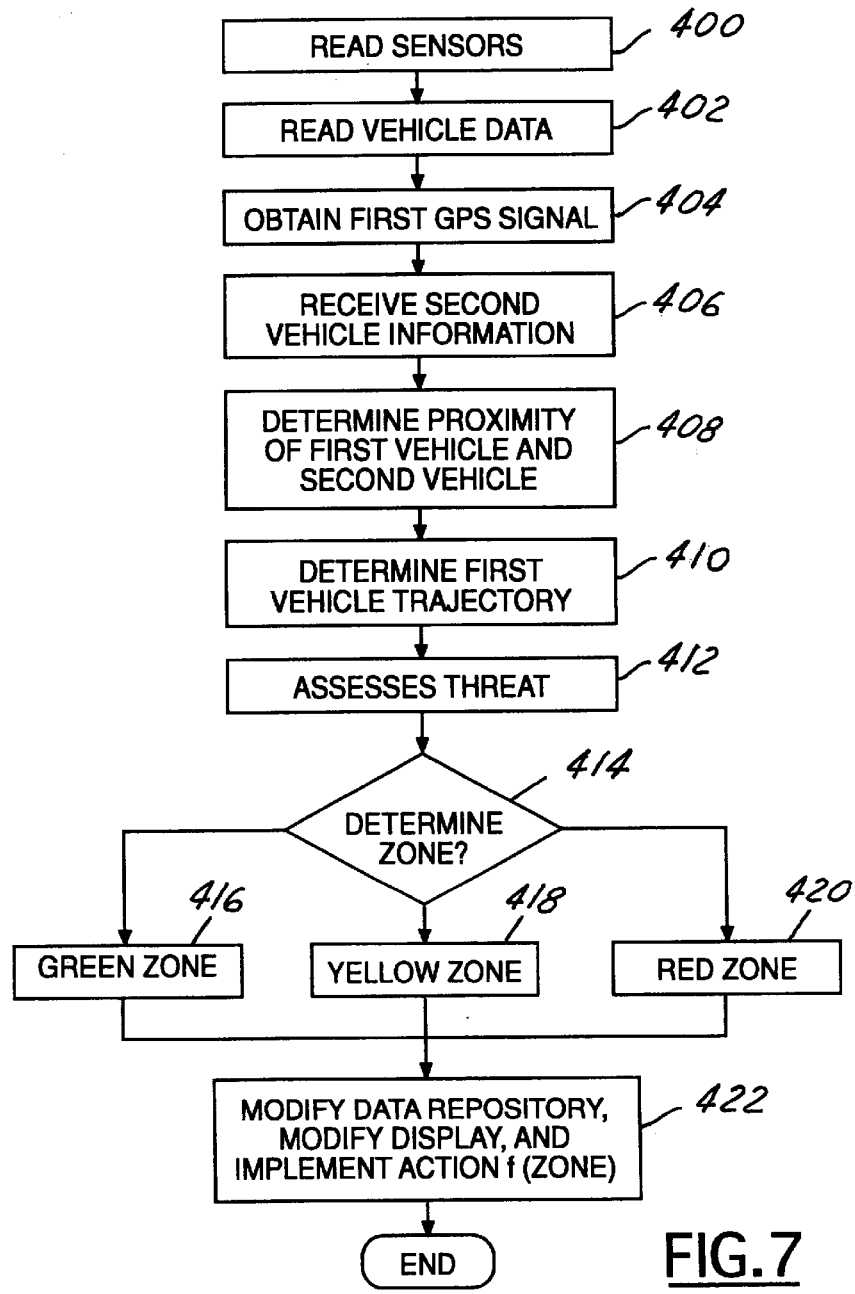
FIG. 7 is a logic flow diagram of the operation of the spheroidal threat assessment system of FIG. 6.

Referring now to FIG. 7, a logic flow diagram of the operation of the spheroidal threat assessment system of FIG. 6 is shown. In step 400, the various sensor data for the system is determined. This includes the sensor data 20 (FIG. 1). In step 402, all the vehicle data is determined such as in included in vehicle data 16 (FIG. 1). In step 404, the first GPS signal is obtained for the vehicle. In step 406, upon the detection of a second vehicle or object within a zone of surveillance, information regarding the second vehicle or object is received from the second vehicle or obtained through sensor detection on the operator's vehicle. The second vehicle information may be various information such as the speed, heading, vehicle type, position, and road conditions from the other vehicle or vehicles in the network. In step 408, the proximity of the first vehicle with respect to the second vehicle is determined. The proximity may be merely a distance calculation. In step 410, the first vehicle trajectory relative to the second vehicle is determined. The first vehicle trajectory uses the information such as the positions and various sensors to predict a path of expected travel for the first vehicle and the second vehicle. In step 412, a threat assessment of the first vehicle trajectory relative to the second vehicle trajectory is determined. The threat assessment can be categorized based upon the severity of or the immediately of the perceived threat of impact. The threat is preferably scaled to provide various types of warning to the vehicle operator as well as the countermeasure system and threat assessment system.

The threat assessment may be made based upon conditions of the vehicle trajectory and vehicle type as well as based upon tire information which may provide indication as to the braking capability of the first vehicle and/or the second vehicle. Thus, the threat may be adjusted accordingly. Also, the road surface condition may be factored into the threat assessment. On clear, dry roads, a threat may not be as eminent as if the vehicle is operating under the same conditions on a wet or snowy road.

Based upon the assessed threat, the appropriate surveillance zone is determined in step 414. Thus, based primarily upon the proximity of the second vehicle, the zone 416, yellow zone 418 or red zone 420 will become active. In addition or alternatively, based upon the vehicle operator's actions what would otherwise be a green zone activation may be indicated as a yellow zone activation or a red zone surveillance. As described with reference to FIG. 6, depending upon the surveillance zone active at a given point in time, the type of data and priority of data in the data repository 302 is modified. As well, the operator display may be modified to indicate the threat assessment and/or active zone of surveillance. In addition, actions associated with the surveillance zone are implemented which, for example, includes a warning for a yellow zone activation, and active or passive countermeasures for a red zone activation as shown in step 422.

As would be evident to those skilled in the art, various permutations and modifications to the above method and system may be performed. For example, information regarding a detected vehicle may be obtained from an autonomous sensing on the operator's vehicle, wireless transponding from surrounding vehicles, or the vehicle's operating environment itself such as in the case of an intelligent intersection having capability to detect and monitor vehicles within its field-of-view and transmit information regarding such vehicles to vehicles in the area having the capability to receive such information.

From the foregoing, it will be seen that there has been brought to the art a new and improved method and apparatus for pre-crash threat assessment using spheroidal partitioning. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A method for operating a pre-crash sensing system for a vehicle having an object detecting system and an associated data storage, the method comprising:

partitioning the vehicle operating environment into a plurality of zones wherein each zone represents a different area surrounding the vehicle;

in response to detecting an object within any one of said zones, activating said zone; and modifying an operating state of said object detection system and the contents of said data storage as a function of said active zone.

2. A method according to claim 1 comprising modifying an operator display as a function of said active zone.

3. A method according to claim 1 wherein activating said zone comprises generating a threat assessment value indicative of an impact threat associated with said detected object and activating said zone as a function of said threat assessment value.

4. A method according to claim 1 wherein partitioning comprises partitioning the vehicle operating environment into first, second and third zones wherein the first zone represents an area immediately surrounding said vehicle, said second zone is outside of said first zone, and said third zone is outside of said second zone.

5. A method according to claim 4 wherein each of said first, second and third zones is spheroidal and concentric with respect to the vehicle.

6. A method according to claim 4 comprising deploying countermeasures when said first zone is active.

7. A method according to claim 4 comprising displaying a warning on an operator display when said second zone is active.

8. A method according to claim 1 wherein modifying comprises prioritizing sensor data associated with said object detection system as a function of said active zone.

9. A method according to claim 1 wherein modifying comprises establishing a wireless communication channel between said vehicle and said detected object for receiving object data from said detected object.

10. A method for operating a pre-crash sensing system for a vehicle having an object detecting system and an associated data storage, the method comprising:

partitioning the vehicle operating environment into first, second and third zones wherein the first zone represents an area immediately surrounding said vehicle, said second zone is outside of said first zone, and said third zone is outside of said second zone, wherein each of said zones is spheroidal and concentric with respect to the vehicle;

in response to detecting an object within one of said zones, activating said zone; and modifying an operating state of said object detection system and the contents of said data storage as a function of said active zone.

11. A method according to claim 10 comprising, when said third zone is active, providing approximately equal priority to data within said data storage wherein said data storage contains data from said object detection system, data received from at least one detected object, and data received from a wireless navigational network.

12. A method according to claim 10 comprising, when said second zone is active, establishing a wireless communications channel between said vehicle and said detected object, and assigning greater priority to data within said data storage regarding said detected object than data received from a wireless navigational network.

13. A method according to claim 10 comprising, when said first zone is active, activating counter-measures, and assigning highest priority to data within said data storage regarding said detected object than any other data within said data storage.

14. A pre-crash sensing system for a vehicle comprising:

an object detection system including at least one object detection sensor and providing sensing data;

a transponder for receiving object data from a detected object across a wireless vehicle network;

a navigational system for receiving navigational data regarding the vehicle operating environment;

a data storage in operative communication with said object detection system, transponder and said navigational system for storing said sensing data, object data and navigational data; and a controller in operative communication with said data storage, said controller including logic programmed to:

partition the vehicle operating environment into a plurality of zones wherein each zone represents a different area surrounding the vehicle; and in response to detecting an object within any one of said zones, activate said zone and prioritize said sensing data, object data and navigational data as a function of said active zone.

15. A pre-crash sensing system according to claim 14 comprising an operator display and wherein said controller logic is programmed to modify said display as a function of said active zone.

16. A pre-crash sensing system according to claim 14 wherein said plurality of zones comprises first, second and third zones wherein the first zone represents an area immediately surrounding said vehicle, said second zone is outside of said first zone, and said third zone is outside of said second zone.

17. A pre-crash sensing system according to claim 16 wherein each of said zones is spheroidal and concentric with respect to the vehicle.

18. A pre-crash sensing system according to claim 16 wherein said controller logic is programmed to provide approximately equal priority to said sensing data, object data and navigational data when said third zone is active.

19. A pre-crash sensing system according to claim 16 wherein said controller logic is programmed to give higher priority to said sensing data and said object data than said navigational data when said second zone is active.

20. A pre-crash sensing system according to claim 16 wherein said controller logic is programmed to provide highest priority to said sensing data when said first zone is active.

* * * * *